United States Patent [19]

Bagchi

[11] Patent Number: 4,920,004

[45] **Date of Patent: * Apr. 24, 1990**

[54] GELATIN-GRAFTED POLYMER PARTICLES

[75] Inventor: Pranab Bagchi, Webster, N.Y.

[73] Assignee: Eastman Kodak Company, Rochester, N.Y.

[ * ] Notice: The portion of the term of this patent subsequent to Aug. 8, 2006 has been disclaimed.

[21] Appl. No.: 307,393

[22] Filed: Feb. 7, 1989

Related U.S. Application Data

[63] Continuation-in-part of Ser. No. 98,245, Sep. 18, 1987, abandoned.

[51] Int. Cl.[5] .............................................. B32B 42/02

[52] U.S. Cl. .................................... 428/407; 430/523; 430/950; 430/138

[58] Field of Search ................ 428/407; 430/523, 950, 430/138

[56] References Cited

U.S. PATENT DOCUMENTS

| | | |
|---|---|---|
| 2,787,545 | 4/1957 | Gates, Jr. et al. . |
| 3,287,289 | 11/1966 | Ream et al. . |
| 3,507,661 | 4/1970 | Ofstead . |
| 3,767,448 | 10/1973 | Hutton . |
| 3,853,987 | 12/1974 | Dreyer . |
| 4,070,296 | 1/1978 | Gibson et al. . |
| 4,172,731 | 10/1979 | Heigold et al. . |
| 4,328,301 | 5/1982 | Wright . |

*Primary Examiner*—Jack P. Brammer
*Attorney, Agent, or Firm*—Paul L. Marshall

[57] ABSTRACT

There are disclosed polymer particles that are individually covered with gelatin that is covalently bonded thereto. The particles are useful in a variety of applications, such as photographic matting agents.

5 Claims, 1 Drawing Sheet

GELATIN-GRAFTED POLYMER PARTICLES

This is a continuation-in-part of U.S. application Ser. No. 098,245, filed Sept. 18, 1987, now abandoned.

FIELD OF THE INVENTION

This invention relates to polymer particles and to coated polymer particles.

BACKGROUND OF THE INVENTION

Matting agents are often used in photographic elements to provide a rough surface to the element, which is often desirable. Matting agents can provide an irregular surface to a photographic element, thereby permitting sufficient surface roughness to allow retouching or writing on the surface of the element. Surface roughness can also be desirable to prevent the surface of the photographic material from sticking to an adjacent surface and can provide a desired coefficient of friction to allow for use in apparatus for rapid handling and transport of the photographic material. Additionally, matting agents can help prevent the formation of Newton's rings when printing and enlarging because the area of contact of the surface of the photographic material with another material is relatively small due to the spacing effect of the matting agent. In lithographic photographic processes involving juxtaposing an unexposed photographic element with an original image that is desired to be copied, or an image-containing processed film element with a printing plate to impose an image on the plate, roughness on the surface of the film element imparted by a matting agent allows for relatively rapid vacuum draw-down between the film element and the original or plate.

Matting agents are usually present in a separate, overcoat layer of a photographic element, although they can be incorporated in a lower layer such as an emulsion layer as long as they impart roughness to the element. Examples of organic matting agents are particles, often in the form of beads, of polymers such as polymeric esters of acrylic and methacrylic acid, e.g., poly(methyl methacrylate), cellulose esters such as cellulose acetate propionate, cellulose ethers, ethyl cellulose, polyvinyl resins such as poly(vinyl acetate), styrene polymers and copolymers, and the like. Examples of inorganic matting agents are particles of glass, silicon dioxide, titanium dioxide, magnesium oxide, aluminum oxide, barium sulfate, calcium carbonate, and the like. Matting agents and the way they are used are further described in U.S. Pat. Nos. 3,411,907 and 3,754,924.

It is a common practice in the photographic art to coat more than one layer of a photographic element in a single pass through a coating machine. Such multilayer coating procedures are described, for example, in U.S. Pat. Nos. 2,761,791 and 3,508,947. These multilayer coating procedures often result in savings of time, effort, and expense in the coating of elements. In the coating of matting agent overcoat layers, such multilayer coating techniques (or at least coating the matte layer in a separate step while the underlying layer is still wet) are even more desirable, as they lead to improved adhesion of the matting agent to the photographic element, preventing washout of the matting agent during processing.

When such multiple wet layers are dried, drying proceeds from the surface inward, which tends to force the matting agent particles from the overcoat layer into the underlying emulsion layer. In many photographic elements, such as graphic arts photographic elements for use in preparing lithographic printing plates, rapid drying of the layers is desirable to improve the dimensional stability of the element. This rapid drying, however, aggrevates the problem of forcing matting agent particles into the emulsion layer of the element.

When such an element is imagewise exposed and processed, the image density in the area underlying a matting agent particle that has invaded the emulsion layer is diminished compared to other areas of the emulsion that have received equivalent exposure. These areas of decreased image density appear as small white spots in the image. The resulting visual effect has been called the "starry night" effect due to the similarity in appearance to a starry night sky.

Prior to the present invention, then, one was left with the choice of applying the matting agent to a dried layer, which leads to poor adhesion and wash-off of the matting agent during processing, or applying the matting agent to a wet layer, which leads to the starry night effect. It would therefore be highly desirable to provide a matting agent that can be incorporated in a photographic element in such a way that it does not wash off the element during processing and does not lead to the starry night effect, even if the element is subjected to rapid drying after coating.

SUMMARY OF THE INVENTION

The present invention provides polymer particles that are individually covered with gelatin that is covalently bonded thereto.

When the particles are used as a matting agent in a photographic element, the gelatin covalently bonded to the particles can be covalently bonded (i.e., cross-linked) with gelatin in an adjacent layer of the element. The matting agent can then be applied to the surface of a gelatin-containing layer after the layer has been partially or fully dried, without subjecting the element to wash-off of the matting agent during processing. The matting agent tends not to be forced into any underlying emulsion layers, thus reducing the problem of the starry night effect.

DESCRIPTION OF THE PREFERRED EMBODIMENTS

Figure 1:
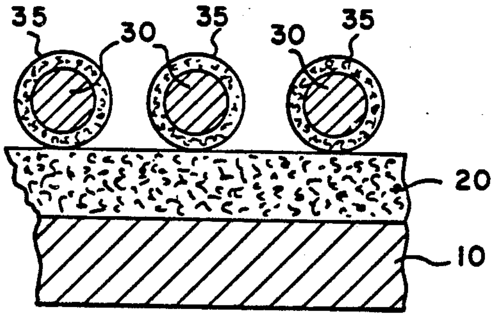

Polymer particles useful in the present invention include any polymer that is capable of covalently bonding with gelatin, either directly or with the aid of a cross-linking agent.

Monomers, the polymers or copolymers of which covalently bond with gelatin directly, include monomers with an active halogen atom such as vinylchloroacetate, vinyl halogenated aromatics (e.g., chloromethylstyrene), chloroalkyl acrylic or methacrylic esters (e.g., chloroethyl methacrylate, 3-chloro-2-hydroxypropyl-methacrylate, or chloroethyl acrylate), isocyanates (e.g., isocyanatoethyl acrylate, isocyanatoethyl methacrylate, or $\alpha,\alpha$-dimethylmetaisopropenylbenzyl isocyanate), epoxides (e.g., glycidyl acrylate or glycidyl methacrylate), and compounds containing aldehyde groups (e.g., vinyl benzaldehyde and acrolein), and monomers containing chloroethylsulfone groups or vinyl sulfone groups (e.g., chloroethylsulfonylmethylstyrene and vinlysulfonylmethylstyrene), as described in U.S. Pat. No. 4,161,407 issued to Campbell. Monomers, the polymers and copolymers of which are capable of covalently bonding with gelatin through the use of a cross-linking agent, include carboxylic acids (e.g., acrylic acid, methacrylic acid, itaconic acid, and maleic acid or anhydride), amine-containing monomers (e.g., 2-aminoethyl methacrylate and N-(3-aminopropyl) methacrylamide hydrochloride), and active methylene group-containing monomers (e.g., 2-acetoacetoxyethyl methacrylate and diacetone acrylamide).

Polymers useful in the invention preferably comprise at least 0.1 mole percent and more preferably at least 1 mole percent of monomers, the polymers or copolymers of which are capable of covalently bonding with gelatin, either directly or with the aid of a cross-linking agent.

In one embodiment of the invention, the polymer useful in the present invention is represented by the formula:

$$-(A)_x-(B)_{100-x}-$$

wherein A represents recurring units derived from one or more of the monomers described above that are capable of covalently bonding with gelatin, and B represents recurring units derived from one or more other ethylenically unsaturated monomers.

Monomers represented by B include essentially any monomer capable of copolymerizing with the above-described monomers without rendering them incapable of covalently bonding with gelatin. Examples of such monomers include ethylenically unsaturated monomers such as styrene and styrene derivatives (e.g., vinyltoluene, vinylbenzene, divinylbenzene, 4-t-butylstyrene, and 2-chloromethylstyrene) and acrylic and methacrylic acid esters (e.g., methyl methacrylate, methyl acrylate, ethyl methacrylate, n-butyl acrylate, 2-ethylhexyl methacrylate, 2-hydroxyethyl methacrylate, 2-hydroxyethyl acrylate, ethylene dimethacrylate, methacrylamide, and acrylonitrile). In such a copolymer, the amount of copolymers that are capable of covalently bonding with gelatin should be sufficient to bind a contiguous layer of gelatin to the surface of the polymer particle.

In the above formula, x represents from 0.1 to 100 mole percent and preferably from 1 to 20 mole percent.

Polymer particles used in the present invention can be any size or shape depending on the use for which they are intended. One such use is as a matting agent to provide surface roughness for polymer- or gelatin-surfaced articles. The polymer particles can have a mean diameter of from about 10 to $10^6$ nm and preferably from about 10 to $10^5$ nm. A preferred mean diameter for polymer particles to be used as matting agents in photographic elements is in the range of 1 to 15 microns. Mean diameter of a particle is defined as the diameter of a spherical particle of identical mass. In some embodiments of the invention, it is preferably to have polymer particles that are in the form of spherical beads having diameters in the size ranges described above.

The gelatin to be covalently bound to the polymer particles can be any of the types of gelatin known in the photographic art. These include, for example, alkali-treated gelatin (cattle bone or hide gelatin), acid-treated gelatin (pigskin or bone gelatin), and gelatin derivatives such as partially phthalated gelatin, acetylated gelatin, and the like. The gelatin may be hardened, as is known in the art. The gelatin covalently bound to the polymer particles may be cross-linked through the use of a conventional cross-linking agent. The gelatin layer on the polymer particles is preferably on the order of the thickness of one gelatin molecule. The actual measured thickness of the gelatin layer will depend on factors such as the molecular weight of the gelatin, the pH and the size of the particle, and is generally from about 10 to 60 nm and preferably from about 10 to 40 nm.

The polymer particles can be prepared by techniques well-known in the art, such as by polymerization followed by grinding or milling to obtain the desired particle size, or more preferably by emulsion or suspension polymerization procedures whereby the desired particle size can be produced directly as stable dispersions. Emulsion polymerization techniques can be employed to produce particle sizes ranging from about 0.01 to 5 μm (preferably about 0.1 to 2.5 μm) as stable aqueous dispersions that can be coated directly without isolation. Larger size particles, i.e., over about 3 μm are preferably prepared by suspension polymerization, often in an organic solvent system from which the particles are isolated and resuspended in water for most economic coating procedures, or most preferably by "limited coalescence" procedures taught by U.S. Pat. No. 3,614,972. The bulk, emulsion, and suspension polymerization procedures are well-known to those skilled in the polymer art and are taught in such text books as W. P. Sorenson and T. W. Campbell, *Preparation Methods of Polymer Chemistry*, 2nd ed., Wiley (1968) and M. P. Stevens, *Polymer Chemistry—An Introduction*, Addison Wesley Publishing Co. (1975).

The polymer particles, if the polymer is of the type as described above that is capable of bonding directly with gelatin, may be covalently bonded with gelatin simply by contacting the particles with gelatin under conditions as described below. If the polymer is of the type that utilizes a cross-linking agent to bond with gelatin, the polymer particles are preferably first contacted with the cross-linking agent and then with gelatin, so as that the gelatin preferentially reacts with the polymer particles, instead of gelatin-gelatin cross-linking. Carbamoyl pyridinium cross-linking agents are advantageously utilized in the practice of this invention because they tend to first bond to a carboxyl group on a polymer particle and then with an amino group on the gelatin molecule.

The contacting of the polymer particles and gelatin is preferably performed in an aqueous dispersion of the particles. The concentration of polymer particles in the aqueous dispersion is preferably less than about 25% and more preferably less than about 15% by weight. The concentration of gelatin in the aqueous dispersion is preferably less than about 25% and more preferably less than about 15% by weight.

The pH of the aqueous dispersion and the concentration of the particles and gelatin should be adjusted to prevent bridging of gelatin molecules between polymer particles, or coagulation. The pH of the gelatin is preferably maintained above the isoelectric pH of the gelatin (e.g., above 5.8 and preferably between 8 and 10 for lime-processed bone gelatin). Under such conditions, both the particles and the gelatin should have the same charge, preferably negative, in order to minimize coagulation.

These particles can be utilized in a variety of applications. These include use as a matting agent for polymer- or gelatin-surfaced articles. The gelatin on the particles can be covalently bonded to the polymer or gelatin surface of the article to give improved adhesion to the article. When used as a matting agent for a photographic element, the particles offer improved adhesion to the photographic element without subjecting the element to the starry night effect. Other uses of the particles of the invention include: in an adhering subbing layer in multilayer elements such as photographic elements, in a protective overcoat layer for multilayer elements, as a shock-absorbing agent in photographic elements to relieve pressure sensitivity, in color filter arrays, as latex particles in a cross-linking water-swellable gelatin or polymer membrane that can be used for any of a number of purposes such as artificial skin or a semi-permeable barrier layer for controlled release of compounds (e.g., transdermal pharmaceutical patches).

Polymer particles having gelatin covalently bonded thereto (or "gel-grafted polymer particles") are advantageously utilized as a matting agent in photographic elements. The polymer core provides the particles with the necessary size, hardness, and inertness to effectively function as matting agents while the gelatin shell allows the particles to be cross-linked with gelatin layers in the element so that they are not washed off during processing.

When used as a matting agent, the gel-grafted polymer particles of the invention can be located any place in the photographic element where there is gelatin with which the gelatin covalently bound to the particle can cross-link, and where it is desirable to have a matting agent. The particles can be incorporated in an overcoat layer that is the outermost layer of the photographic element or they can be incorporated in an underlying layer such as an emulsion layer as long as the particle sizes and layer thicknesses are such that the matting agent performs its function of imparting roughness to the surface of the element. Elements containing matting agents are described in further detail in U.S. Pat. No. 4,172,731 and *Research Disclosure* 17643, December, 1978.

In a preferred embodiment of the invention, the gel-grafted polymer particles are utilized as a matting agent on the outermost surface of a photographic element, as shown in FIG. 1. In the element of FIG. 1, there is provided a support 10 having thereon a gelatin-containing layer 20, which may be, for example, a silver halide emulsion layer. Polymer particles 30 having gelatin 35 covalently bound thereto are positioned on top of layer 20. The gelatin 35 is cross-linked with the gelatin in layer 20.

In a preferred embodiment of the invention, a photographic element such as the one described in FIG. 1 is prepared by coating the gelatin-containing layer onto a support, at least partially drying the layer, applying the gel-grafted polymer particles to the surface of the layer, and hardening the gelatin in the layer so as to cause cross-linking between the gelatin in the layer and the gelatin covalently bonded to the polymer particles.

The gelatin-containing layer and other layers in the element may be coated by any of the known coating methods, such as curtain coating, roller coating, bead coating, doctor blade coating, gravure coating, reverse gravure coating, and the like. The layer is generally dried by simple evaporation, which may be accelerated by known techniques such as convection heating. Known coating and drying methods are described in more detail in the above-referenced *Research Disclosure* 17643. The polymer particles can be applied by a variety of methods, such as with an air jet or simply dropped onto the surface of the gelatin-containing layer. In such cases it may be desirable for the gelatin-containing layer to have been dried sufficiently to prevent invasion of the emulsion layer by the particles during subsequent drying, but left still somewhat tacky so as to prevent the particles from being dislocated before the gelatin covalently bonded to them cross-links with the gelatin in the layer.

A preferred method of applying the polymer particles to the gelatin-containing layer is to coat a dispersion of the particles in a liquid medium such as an organic solvent or water, which may optionally contain a small amount of gelatin (e.g., on the order of the same weight concentration as the polymer particles, preferably less than about 25%, based on total weight of the dispersion), onto the gelatin-containing layer. Such a coating dispersion would generally have a weight ratio of polymer particles to liquid of between 1:99 and 5:95.

The cross-linking of the gelatin in the gelatin-containing layer and the gelatin that is covalently bound to the polymer particles may be carried out with any of the compounds known to cross-link, or harden, gelatin. These include, for example, free dialdehydes such as succinaldehyde, blocked dialdehydes, sulfonate esters, active esters, epoxides, aziridines, blocked active olefins, carbodiimides, carbamoylpyridiniums, vinyl sulfones, polymeric hardeners such as dialdehyde starches or poly(acrolein-methacrylic acid), and many others. The cross-linking is generally carried out by simply applying solutions of these hardeners to the photographic element.

The cross-linking compound can be applied to either the particles or the gelatin-containing layer before the particles are contacted with the layer if such contacting is done while there is still enough residual cross-linking compound present to cross-link the gelatin in the layer to the gelatin on the particles when they are brought into contact. Alternatively, the cross-linking compound can be applied after the particles are brought into contact with the gelatin-containing layer. Further disclosure of cross-linking hardeners is given in the above-referenced *Research Disclosure* 17643.

Photographic elements in which the particles of the invention can be utilized generally comprise at least one light-sensitive layer, such as a silver halide emulsion layer. This layer may be sensitized to a particular spectrum of radiation with, for example, a sensitizing dye, as is known in the art. Additional light-sensitive layers may be sensitized to other portions of the spectrum. The light sensitive layers may contain or have associated therewith dye-forming compounds or couplers. For example, a red-sensitive emulsion would generally have a cyan coupler associated therewith, a green-sensitive emulsion would be associated with a magenta coupler, and a blue-sensitive emulsion would be associated with a yellow coupler. Other layers and addenda, such as antistatic compositions, subbing layers, surfactants, filter dyes, protective layers, barrier layers, development inhibiting releasing compounds, and the like can be present in photographic elements of the invention, as is well-known in the art. Detailed description of photographic elements and their various layers and addenda can be found in the above-identified *Research Disclosure* 17643 and in James, *The Theory of the Photographic Process*, 4th, 1977.

The invention is further illustrated in the following examples.

EXAMPLE 1

Step 1—Preparation of polymer particles

Styrene (928 g) and chloromethylstyrene (46.4 g), were mixed in a bottle. 7.4 g of Aerosol-OT surfactant (American Cyanamide) and then 4.92 g of 2,2′-azobis(2-methylpropionitrile) was dissolved in the mixture. Nitrogen-purged distilled water (3240 g) was added to the mixture, which was then blended for 30 seconds and placed under nitrogen in a constant temperature bath of 70° C. for 22 hours. The unreacted monomers were then removed by evaporation and the remaining suspension was cooled and filtered through cheese cloth to yield 3428 g of bead suspension having 21.7% solids by weight.

Step 2—Covalent binding of gelatin to the particles

The suspension from step 1 was placed in a 12 liter three-neck flask fitted with an air-driven stirrer and a condenser. The suspension was heated to 60° C. and the pH was adjusted to 8.0. Lime-processed bone gelatin (745 g dry weight) was added to 2683 g of distilled water and heated to 60° C. to cause dissolution. The pH of the gelatin solution was adjusted to 8.0, the solution was added to the flask containing the suspension, and the mixture was stirred for 2 hours to yield a suspension of gel-grafted polymer particles.

EXAMPLE 2

Preparation of a photographic element having gel-grafted polymer particles as a matting agent.

A silver chlorobromide emulsion was coated onto a poly(ethylene terephthalate) support. The components of the emulsion were as follows:

lime-processed bone gelatin 2.69 g/m$^2$
silver halide 3.34 g/m$^2$
polymer latex as described in U.S. Pat. No. 3,411,911 0.70 g/m$^2$ To prepare elements 1*a*–1*f* as shown in Table I, an overcoat layer containing 0.48 g/m$^2$ of gelatin was coated over the emulsion layer. The coating was hardened using formaldehyde at a concentration of 2.5 weight percent based on the total weight of gelatin in the coating, then chill set and dried. The coating was then overcoated using reverse gravure roller coating with an aqueous solution of the particles prepared in Example 1 having a mean diameter of 2 μm at coverages as described in Table I below.

For comparison, elements 2*a*–2*d* and 3 were prepared as above except that the final overcoat contained either poly(styrene-co-methacrylic acid-co-divinylbenzene) (39:50:11) beads with no gelatin covalently bonded thereto having a mean diameter of 6 μm for element 2, or with no matte coating at all for element 3. Also for comparison, element 4 was prepared as above, but with poly(methyl methacrylate) beads with no gelatin bonded thereto having a mean diameter of 3.5 μm and with the chill setting and drying occurring after simultaneous coating of the emulsion layer and the bead-containing layer.

The elements described above were exposed and processed using Kodak Super Rapid Access® Developer, a conventional black and white development process utilizing hydroquinone and dimezone as developing agents, with a Kodamatic® 65 Processor. Adhesion of the matting agent was measured using a vacuum smoothness test. In this test, the element was placed in a vacuum frame and vacuum was applied. Smooth-surfaced elements require greater amounts of time for vacuum draw-down whereas elements having surface roughness imparted by a matting agent require shorter amounts of time for vacuum draw-down. Vacuum draw-down is a measure of the adhesion of the matte beads to their adjacent underlayer. If adhesion is poor, the beads are removed during processing, and the vacuum draw-down times are much greater for the processed film than for the unprocessed film. If adhesion is good, the draw-down time for processed is about the same as for the unprocessed film.

The starry night effect for each element was determined by a visual inspection of areas of the processed element having the highest image density. A starry night rating was then assigned based on the number of light spots observed. The starry night rating is based on an arbitrary scale of 1 to 8 with 1 representing no spots observed, 8 representing a large number of spots, and 5 representing a marginally acceptable rating for typical graphic arts photographic films. The results are shown below in Table I.

TABLE I

| Element | Matting Agent Type | Matte Covering (g/m$^2$) | Vacuum Smoothness Time (seconds) Raw | Processed | Starry Night Rating |
|---|---|---|---|---|---|
| 1a | gel-grafted polymeric | 0.09 | 53 | 96 | 3 |
| 1b | particles coated | 0.15 | 9 | 6 | 2 |
| 1c | over chill-set and | 0.15 | 6 | 3 | 3 |
| 1d | dried gelatin- | 0.10 | 10 | 9 | 4 |
| 1e | containing | 0.10 | 5 | 3 | 2 |
| 1f | layer | 0.10 | 8 | 10 | 2 |
| 2-a | non-gel-grafted | 0.20 | 6 | 600 | 3 |
| 2-b | polymeric particles | 0.20 | 7 | 260 | 3 |
| 2-c | coated over chill-set | 0.15 | 5 | 400 | 4 |
| 2-d | and dried gelatin-containing layer | 0.10 | 4 | 560 | 3 |
| 3 | none | — | 400 | 470 | 3 |
| 4 | non-gel-grafted polymeric particles coated over wet gelatin-containing layer | 0.03 | 23 | 28 | 5 |

As shown by the results in Table I, photographic elements of the invention such as element 1 offer significantly improved matting agent adhesion, as evidenced by short vacuum draw-down times for processed film, as compared to elements having a polymer particle matting agent with no gelatin covalently bonded thereto that is coated onto a chill set and dried emulsion layer such as elements 2 and 3. The elements of the invention offer significantly improved starry night performance over elements such as element 4 having a polymer particle matting agent with no gelatin covalently bonded thereto that is simultaneously coated with a wet emulsion layer.

EXAMPLE 3

Step 1—Preparation of polymer particles

Sodium chloride (2888 g), potassium dichromate (11 g), diethanolamine adipate (49.5 g), and Ludox AM $SiO_2$ particles (550 g) were sequentially added to 8690 g distilled water to form an aqueous solution. To this solution was added a mixture of styrene (5940 g), methacrylic acid (330 g), divinylbenzene (330 g), and 2,2'-azobis-(2,4-dimethylvaleronitrile) (69.3 g). This mixture was stirred vigorously for 2 minutes and then emulsified in a homogenizer at 5000 psi. The resulting emulsion was placed in a reaction vessel, which was sealed. The emulsion was heated to 50° C. while being stirred at 80 rpm and held at that temperature for approximately 20 hours. The mixture was then heated to 75° C. and held at that temperature for 3 hours, cooled to room temperature, and filtered through a double layer of cheese cloth. The polymer particles were then filtered out of the dispersion using a Buchner funnel with 230 grade filter paper and redispersed in a solution of 11.5 kg distilled water, 1200 g 50% sodium hydroxide, and 8.34 g sodium dodecyl sulfate, and stirred vigorously for 15 minutes. The polymer particles were filtered out using the same filter apparatus, redispersed in a solution of 11.66 kg distilled water and 600 g 50% sodium hydroxide, filtered out again, and washed with distilled water. The polymer particles had a mean diameter of 6.4 μm.

Step 2—Covalent binding of gelatin to the particles

A gelatin solution was prepared by dissolving 1099 g of lime-processed bone gelatin in 6.9 kg of distilled water. 67 g of 2N sodium hydroxide was added to the solution, which was then filtered. The particles of step 1 were dispersed in distilled water at a pH of between 8 and 9 to yield 1035 g of a dispersion with a solids content of 29 weight percent. This dispersion was diluted with 1 kg distilled water and the pH adjusted to between 8 and 9 with 2N sodium hydroxide. The dispersion was stirred and heated to 60° C., and 10.4 g of 1-(4-morpholinocarbonyl)-4-(2-sulfoethyl) pyridinium hydroxide, inner salt was added. The mixture was stirred for 15 minutes, then 2343 g of the above-described gelatin solution heated to 60° C. was added. After 20 minutes of stirring, essentially all the gelatin had covalently bonded to the particles (weight ratio of polymer to gelatin of 1:1, mean diameter of 6.9 μm).

Two additional sets of gel-grafted polymer particles were prepared in the same manner as those above, except that the weight ratios of polymer particles to gelatin were 2:1 (prepared using 1172 g of gelatin solution, mean diameter of 6.8 μm) and 2:3 (prepared using 3516 g of gelatin solution, mean diameter of 6.6 μm), respectively.

EXAMPLE 4

Preparation of photographic elements having gel-grafted polymer particles as a grafting agent A series of photographic elements were prepared as in Example 2. Element 5 was overcoated with an aqueous solution of 1.0% by weight of the 1:1 polymer:gelatin particles from Step 2 and 1.0% by weight of gelatin. Element 6 was overcoated with an aqueous solution of 1.0% by weight of the 2:1 polymer:gelatin particles from Step 2 and 0.5% by weight of gelatin. Element 7 was overcoated with an aqueous solution of 1.0% by weight of 2:3 polymer:gelatin particles from Step 2 and 1.5% by weight of gelatin. For comparison, element 8 was overcoated with an aqueous solution of 1.0% by weight of polymer particles from Example 3 and 1.5% by weight of gelatin. Also for comparison, element 9 was overcoated with an aqueous solution of 1.0% by weight of polymer particles from Example 3 and 3.0% by weight of gelatin. The final comparison element, 10, was overcoated with an aqueous solution of 9.1% by weight lime-processed bone gelatin and 0.4% by weight of poly(methyl methacrylate) particles having no gelatin bonded thereto.

The elements were exposed and processed as in Example 2. Vacuum draw-down time and starry night rating were determined before and after processing as in Example 2. In addition to the vacuum draw-down time, the adhesion of the matting agent was also determined by measuring the surface roughness and the maximum peak excursion and average peak height on the surface of the element. These measurements were made with a Gould Micro-Topographer 200. Higher numbers for these measurements show that the presence of matting agent is causing surface roughness and high peaks on the surface of the element. The results are shown in Table II.

TABLE II

| Element | Matting Agent Type | VST (secs) | | Starry Night Rating | Surface Roughness (microinches) | | Max Peak Excursion (microinches) | | Avg. Height (microinches) | |
|---|---|---|---|---|---|---|---|---|---|---|
| | | Raw | Proc | | Raw | Proc | Raw | Proc | Raw | Proc |
| 5 | gel-grafted polymeric particles coated over chill-set and dried gelatin-containing layer | 13.0 | 13.2 | 2 | 3.17 | 3.76 | 126.8 | 140.2 | 106.5 | 110.5 |
| 6 | | 14.2 | 15.2 | 2 | 1.45 | 2.73 | 90.3 | 131.7 | 75.1 | 93.0 |
| 7 | | 11.7 | 9.4 | 2 | 3.68 | 1.81 | 135.2 | 90.0 | 108.0 | 79.0 |
| 8 | non-gel-grafted polymeric particles coated over chill-set and dried gelatin-containing layer | 11.8 | 34.8 | 2 | 3.45 | 1.30 | 134.6 | 50.7 | 107.5 | 33.0 |
| 9 | | 9.3 | 21.8 | 3 | 5.57 | 2.15 | 139.3 | 45.7 | 123.5 | 37.4 |
| 10 | non-gel-grafted polymeric particles coated over wet gelatin-containing layer | 23 | 28 | 5–7 | — | — | — | — | — | — |

As shown in Table II, the elements of the invention having polymer particle matting agents covalently bonded to the adjacent gelatin-containing layer exhibit greater adhesion than prior art elements having matting agent with no gelatin covalently bonded thereto that is coated onto a chill set and dried emulsion layer. They show improved starry night performance over elements having matting agent with no gelatin covalently bonded thereto that is coated onto a wet emulsion layer.

EXAMPLE 5

Step 1—Preparation of polymer particles

Methyl methacrylate (380 g), methacrylic acid (20 g), di(2-ethylhexyl) sulfosuccinate, sodium salt (5 g), lauroyl peroxide (5 g), and distilled water (800 g) were blended together for 90 seconds. The mixture was deoxygenated with a nitrogen purge and maintained at 62° C. for 20 hours while stirring at 100 rpm. The resulting dispersion of polymer particles was determined to have a solids content of 33.2% by weight.

Step 2—Covalent binding of gelatin to the particles 1140 g of the aqueous dispersion from Step 1 was adjusted to a pH of 8.0 with sodium hydroxide, heated to 60° C. while being stirred. 1-(4-morpholinocarbonyl)-4-(2-sulfoethyl) pyridinium hydroxide, inner salt (13.2 g) dissolved in 200 g distilled water was then added to the dispersion and stirred for 15 minutes. To this mixture, 1514 g of a 12.5 weight percent solution of lime-processed bone gelatin at 60° C. was added and stirred for 15 minutes. The dispersion was then filtered through a course screen, and found to have a solids content of 19.2% by weight. The mean particle diameter was found to be 5.5 μm, with a polymer: gelatin weight ratio of 2:1.

EXAMPLE 6

Preparation of photographic elements having gel-grafted polymer particles as a grafting agent Photographic elements were prepared as described in Example 2. Element 11 was overcoated with an aqueous solution of 1.0% by weight of gel-grafted particles from Step 2 and 0.5% by weight of gelatin. Element 12 was overcoated with an aqueous solution of 1.0% by weight of gel-grafted particles from Step 2 and 1.5% by weight of gelatin. Element 13 was overcoated with an aqueous solution of 1.0% by weight of gel-grafted particles from Step 2 and 3.0% by weight of gelatin.

The elements were exposed and processed as in Example 2. The adhesion of the particles to underlying gelatin-containing layer was evaluated by measuring the vacuum smoothness time of the elements before and after processing. The results are shown in Table III.

TABLE III

| Element | Matting Agent Type | VST (secs) Raw | Proc |
|---|---|---|---|
| 11 | gel-grafted polymeric | 22.9 | 23.1 |
| 12 | particles coated over | 19.8 | 19.1 |
| 13 | chill-set and dried gelatin-containing layer | 13.1 | 14.2 |

As shown in Table III, no significant increase in vacuum draw-down time was observed after processing, indicating excellent adhesion of the gel-grafted polymer particles to the underlying gelatin-containing layer.

The invention has been described in detail with reference to preferred embodiments thereof. It should be understood, however, that variations and modifications within the spirit and scope of the invention can be made.

What is claimed is:

1. A particle comprising polymer core having a mean diameter of from about 10 to $10^6$ nm covered with a gelatin shell about 10 to 60 nm thick, said gelatin being covalently bonded to the said polymer core.

2. A particle according to claim 1 wherein said polymer is derived from a monomer comprising an active halogen atom, an isocyanate group, an epoxide group, an aldehyde group, a chloroethylsulfone group, a vinyl sulfone group, an amine group, a carboxylic acid group, or an active methylene group.

3. A particle according to claim 2 wherein said polymer comprises from 0.1 to 100 mole percent of a copolymer that is derived from a monomer comprising an active halogen atom, an isocyanate group, an epoxide group, an aldehyde group, a chloroethylsulfone group, a vinyl sulfone group, an amine group, a carboxylic acid group, or an active methylene group.

4. A particle according to claim 1 wherein said polymer comprises repeating units of the formula:

$$-(A)_x-(B)_{100-x},$$

wherein

A represents recurring units derived from one or more monomers that are capable of covalently bonding with gelatin, B represents recurring units derived from one or more other ethylenically unsaturated monomers, and x represents 0.1 to 100 mole percent.

5. A particle according to claim 4 wherein A represents recurring units derived from one or more monomers comprising an active halogen atom, an isocyanate group, an epoxide group, an aldehyde group, a chloroethylsulfone group, a vinyl sulfone group, an amine group, a carboxylic acid group, or an active methylene group.

* * * * *